United States Patent
Murph et al.

(10) Patent No.: US 10,507,452 B2
(45) Date of Patent: Dec. 17, 2019

(54) CONTROLLED RELEASE OF HYDROGEN FROM COMPOSITE NANOPARTICLES

(71) Applicant: Savannah River Nuclear Solutions, LLC, Aiken, SC (US)

(72) Inventors: Simona H. Murph, Aiken, SC (US); Kaitlin J. Lawrence, Aiken, SC (US); Henry T. Sessions, Aiken, SC (US); Michael A. Brown, Aiken, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 0 days.

(21) Appl. No.: 15/585,748

(22) Filed: May 3, 2017

(65) Prior Publication Data
US 2018/0319658 A1    Nov. 8, 2018

(51) Int. Cl.
| | | |
|---|---|---|
| *B01D 53/14* | (2006.01) | |
| *B01D 53/18* | (2006.01) | |
| *B01D 53/62* | (2006.01) | |
| *C01B 3/02* | (2006.01) | |
| *B01J 20/28* | (2006.01) | |
| *B01J 20/02* | (2006.01) | |
| *C01B 3/00* | (2006.01) | |

(52) U.S. Cl.
CPC ..... *B01J 20/28007* (2013.01); *B01J 20/0211* (2013.01); *B01J 20/0214* (2013.01); *B01J 20/0229* (2013.01); *B01J 20/0233* (2013.01); *B01J 20/0244* (2013.01); *B01J 20/28009* (2013.01); *C01B 3/0026* (2013.01); *B01J 2220/42* (2013.01)

(58) Field of Classification Search
CPC ............... C01B 3/0031; B01J 20/0229; B01J 20/28007; B01J 20/28009
See application file for complete search history.

(56) References Cited

U.S. PATENT DOCUMENTS

| | | | | |
|---|---|---|---|---|
| 5,803,995 A | * | 9/1998 | Tanaka .................. | C01B 3/0031 148/437 |
| 8,251,885 B2 | | 8/2012 | Ueda et al. | |

(Continued)

FOREIGN PATENT DOCUMENTS

CN    102350312    2/2012

OTHER PUBLICATIONS

Zhou et al. "Aluminum Nanocrystals as a Plasmonic Photocatalyst for Hydrogen Dissociation" Jan. 2016, Nano Lett. 16, 1478-1484 (Year: 2016).*

(Continued)

*Primary Examiner* — Amber R Orlando
*Assistant Examiner* — Syed T Iqbal
(74) *Attorney, Agent, or Firm* — Dority & Manning, P.A.

(57) ABSTRACT

Multi-functional materials for use in reversible, high-capacity hydrogen separation and/or storage are described. Also described are systems incorporating the materials. The multi-functional materials combine a hydrogen absorbing material with a high-efficiency and anon-contact energy absorbing material in a composite nanoparticle. The non-contact energy absorbing material include magnetic and/or plasmonic materials. The magnetic or plasmonic materials of the composite nanoparticles can provide localized heating to promote release of hydrogen from the hydrogen storage component of the composite nanoparticles.

19 Claims, 10 Drawing Sheets

(56) References Cited

U.S. PATENT DOCUMENTS

| | | |
|---|---|---|
| 8,636,906 B2 | 1/2014 | Stein |
| 8,822,030 B2 | 9/2014 | Maddan |
| 9,017,713 B2 | 4/2015 | Tishin et al. |
| 9,034,174 B2 | 5/2015 | Cheng |
| 9,469,555 B2 | 10/2016 | Predescu et al. |
| 2007/0164250 A1 | 7/2007 | Hamad-Schifferli et al. |
| 2008/0307960 A1 | 12/2008 | Hendrickson et al. |
| 2015/0217222 A1 | 8/2015 | Hedin et al. |
| 2015/0231269 A1 | 8/2015 | Kaittanis et al. |
| 2016/0038610 A1 | 2/2016 | Trabolsi et al. |
| 2016/0233498 A1* | 8/2016 | Young .................. C01B 3/0031 |
| 2016/0243523 A1 | 8/2016 | Saini et al. |

OTHER PUBLICATIONS

Baffou, G., R. Quidant, and C. Girard. "Heat generation in plasmonic nanostructures: Influence of morphology." Applied Physics Letters 94.15 (2009): 153109.

Science Direct / Jinghua Fang, et al. Hierarchial Bi-Dimensional Alumina/Palladium Nanowire Nano-Architectures for Hydrogen Detection, Storage and Controlled Release Dated: Feb. 2015 ( 8 pages).

Research Gate / Abbas Afkhami, et al. Adsorptive Removal of Congo Red, A Carcinogenic Textile Dye, From Aqueous Solutions by Maghemite Nanoparticles. Dated: Sep. 2009 (7 pages).

LDRD External Report Summary Magnetically Induced Heat Generation for Controlled Hydrogen Isotope Release from Nano-Hydrides Dated 2006 (5 pages).

Spiedigital Library / George Larsen et al. Porous Iron Oxide Nanorods and Their Photothermal Applications. SPIE Vol. 9919-991904-1 Dated: 2016 (8 pages).

\* cited by examiner

CONTROLLED RELEASE OF HYDROGEN FROM COMPOSITE NANOPARTICLES

STATEMENT REGARDING FEDERALLY SPONSORED RESEARCH OR DEVELOPMENT

This invention was made with government support under Contract No. DE-AC09-08SR22470 awarded by the United States Department of Energy. The government has certain rights in the invention.

This application and technology are controlled pursuant to ECCN 1E001 and 1B231.

BACKGROUND

Hydrogen has gained increasing interest in a variety of applications because it has a very high energy density per unit weight and is essentially a non-polluting agent, while the main by-product of energy release from hydrogen is water. Hydrogen can be produced from a variety of sources and processes. For instance, hydrogen can be produced via syngas generation from coal, natural gas, or hydrocarbons obtained from, e.g., fossil fuels or biomass. Beneficially, hydrogen can also be produced from more environmentally friendly techniques, such as by the electrolysis of water using nuclear, wind, or solar energy.

While hydrogen has wide potential as a fuel and in a variety of devices including, but not limited to, rechargeable batteries, pumping and compression systems, and hydrogen absorption coolers, a major drawback in its utilization has been the lack of acceptable hydrogen separation and storage mediums and systems.

Conventionally, hydrogen has been stored in the gas phase under high pressure or in the liquid phase at extremely low temperatures. Unfortunately, such storage mechanisms require expensive processing and facilities (e.g., high pressure containers and low temperature maintenance). As a result, storage of hydrogen in the solid phase as a hydride has been developed. Solid state hydrogen storage materials that have the ability to efficiently and reversibly store hydrogen are of particular interest with respect to devices that can beneficially employ a controlled absorption/desorption mechanism, particularly those having a large hydrogen-storage capacity. Reversible storage of hydrogen in a solid phase, for instance in the interstitial hydride form, can provide a greater volumetric storage density than storage as a compressed gas or a liquid. Moreover, hydrogen storage in a solid phase presents fewer safety problems than those caused by hydrogen stored in a gas or a liquid phase, particularly when desorption can be well controlled.

Solid phase storage of hydrogen in the form of an interstitial hydride commonly utilizes metals or metal alloys as the solid phase hydrogen absorbent. Interstitial hydrides are traditionally termed 'compounds', even though they do not strictly conform to the definition of a compound. They more closely resemble alloys such as steel, and as such are commonly described as incorporating the hydrogen via 'metal bonding.' In interstitial hydrides, hydrogen can exist as either an atomic or diatomic entity and the hydride is formed by the absorption and insertion of hydrogen into the crystal lattice of the metal, metal alloy, or a phase of the metal alloy. Interstitial hydride systems are usually non-stoichiometric with variable amounts of hydrogen atoms in the lattice and as such, their absorption capacity can vary greatly between materials and conditions. In general, however, metal hydride systems have the advantage of high-density hydrogen-storage that is effective for long periods of time. For instance, palladium (Pd) can absorb up to 900 times its own volume of hydrogen at room temperatures.

In addition to high storage density capability, good reversibility is desirable in solid state hydrogen storage to enable repeated absorption-desorption cycles without significant loss of hydrogen storage capabilities. Good absorption/desorption kinetics are also generally necessary to enable hydrogen to be absorbed/desorbed in a relatively short period of time. In addition to other desirable characteristics, a useful solid state hydrogen storage material and system will provide a control mechanism that can tightly control hydrogen desorption from the solid state and prevent excessive pressure build up and possible explosions.

Figure 1:
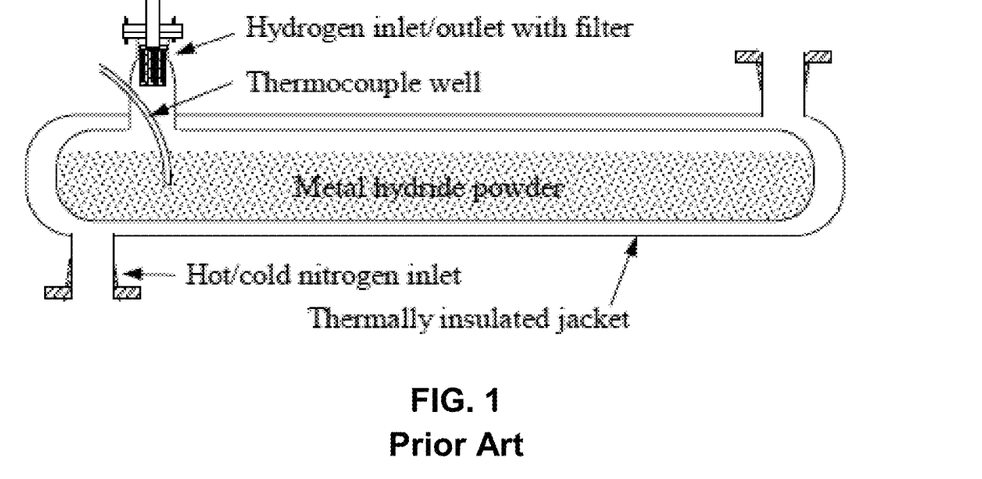
FIG. 1 schematically illustrates a prior art system for storing hydrogen in a solid state form.

A variety of solid state hydrogen storage materials and systems have been developed. For instance, FIG. 1 illustrates a system that includes a bed of metal hydride powder for storing hydrogen in the form of the interstitial metal hydride. In order to control absorption and desorption of the hydrogen, the system requires close temperature control. One way to accomplish this is through a hot/cold nitrogen (HCN) circulation system, as demonstrated in the illustrated system of FIG. 1, for heating and cooling the bed. Unfortunately, such a system requires the use of large compressors, heat exchangers, valves and piping that are bulky and maintenance intensive.

Accordingly, what are needed in the art are materials, systems incorporating the materials, and/or methods for using the materials that can safely and efficiently store and release hydrogen. More specifically, a system that can controllably release hydrogen from a solid state storage material in an efficient and well controlled fashion would be highly beneficial.

SUMMARY

According to one embodiment, disclosed is a multi-functional nanoparticle for hydrogen storage or separation and controlled hydrogen release. The multi-functional nanoparticle can include a magnetic or plasmonic material and a reversible hydrogen absorbing material in thermal contact with one another. More specifically, the reversible hydrogen absorbing material can be a metal or a metal alloy capable of forming a metallic bond with hydrogen to form an interstitial hydride.

Also disclosed is a system for storage or separation and controlled release of hydrogen. A system can include a bed of the composite nanoparticles and an energy source configured for non-contact delivery of energy to the magnetic or plasmonic material of the composite nanoparticles via an alternating magnetic field or an electromagnetic wave. In one embodiment, a system can also include a hydrogen source upstream of the bed and/or a hydrogen collection or employment (e.g., combustion) facility downstream of the bed.

A method for controllably releasing absorbed hydrogen from the multi-functional nanoparticles is also described. For instance, a method can include delivering energy to the magnetic or plasmonic material via an alternating magnetic field of a pre-determined field strength or an electromagnetic wave of a predetermined wavelength, depending upon whether the nanoparticles include a magnetic material or a plasmonic material. Upon delivery, the energy can be absorbed by the magnetic or plasmonic material and released in the form of heat in the surrounding environment. This can heat the reversible hydrogen absorbing material of the nanoparticle thereby promoting hydrogen release from this material. Beneficially, the rate of hydrogen release and/or the amount of hydrogen released from the hydrogen absorbing material can be tailored based upon the magnetic field strength applied or the wavelength of the energy source used.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In general, the present disclosure is directed to materials for use in reversible, high-capacity hydrogen separation and/or storage, systems incorporating the materials, and methods for using materials. More specifically, disclosed multi-functional materials combine a hydrogen absorption material with a high-efficiency non-contact energy absorption material in a composite nanoparticle. The composite nanoparticles can be used in fields that can utilize hydrogen separation and/or storage. For instance, disclosed materials can be utilized in non-contact separation of hydrogen from other analytes, as well as in separation of hydrogen isotopes from one another. The materials can find applications in sensing, manipulation and photothermal destruction of analytes, catalytic processes, biological imaging and magnetic manipulation, hyperthermia applications, and as energy storage materials, among others.

During use, energy can be generated and delivered in a non-contact approach to an energy absorbing component of the composite nanoparticle. This component can then release the absorbed energy in the form of heat, which can increase the temperature of the hydrogen absorbing material and promote the targeted and controlled release of hydrogen gas from the hydrogen absorbing component of the composite nanoparticle. The energy absorbing component can include a magnetic material that can absorb energy when placed in an alternating magnetic field or can include a plasmonic material that can absorb energy when contacted with an electromagnetic wave of a suitable wavelength (e.g., light), or can include a combination of energy absorbing materials.

Depending upon the particular characteristics of the energy absorbing component of the nanoparticles, the rate and amount of hydrogen released from the composite nanoparticles can be controlled by varying the magnetic field strength, for instance by varying the current in a coil, or by varying the intensity of the electromagnetic wave, for instance by varying the wavelength of the light. In one embodiment, the controlled hydrogen release afforded by the technology can be employed to selectively release hydrogen isotopes. This can provide a viable and simple alternative to existing technology for both hydrogen separation and storage. Disclosed systems can be easy and straightforward to implement and can replace existing systems such as bulky hot/cold nitrogen systems or electric heaters that have been utilized in the past.

Disclosed systems can also be designed with a very small footprint, which can provide a safer method of storing and handling explosive, and in some embodiments, radioactive hydrogen isotopes. For instance, when considering use in separation of tritium in the nuclear power industry, the development of a small storage and separation bed could lower costs due to physically smaller design requirements and also enhance safety by minimizing the amount of tritium in the system at any one time.

The hydrogen storage and release systems can also be highly efficient, as the composite materials can promote fast hydrogen kinetics and efficient "on demand" temperature control. Efficiency can also be gained as the energy input to a system can be non-contact, selective, localized and targeted, which can encourage rapid heating and cooling of the composite materials (for instance about 50° C./sec in some embodiments) while the surrounding area need not be subjected to excessive wasted heat, thereby minimizing temperature of the surroundings.

The composite materials are provided as nanoscale materials. As utilized herein, the term "nanoparticles" is intended to refer to particles for which the largest average cross sectional dimension of the particle may range from about 1 nanometer to about 1 micrometer, in some embodiments from about 1 nanometer to about 100 nanometers, and in some embodiments, from about 50 nanometers to about 500 nanometers. The shape of the composite particles may also generally vary as desired. For example, in some embodiments, the particles may have the shape of a sphere, plate, rod, disc, bar, tube, an irregular shape, etc. In some embodiments, examples of which are discussed further herein, the shape and size of the particle can be utilized to control hydrogen absorption and desorption characteristics.

The nanoscale size of the composite particles can be beneficial, as this can promote fast hydrogen exchange by shortening diffusion distances. Bulk porous materials can exhibit a larger penetration depth of the hydride reaction into the bulk, which increase both the hydrogen absorption and desorption times. In addition, the composite nanoparticles can exhibit higher kinetics of gas uptake and release as compared to bulk porous materials such as bulk polymicrocrystalline materials.

Figure 2:
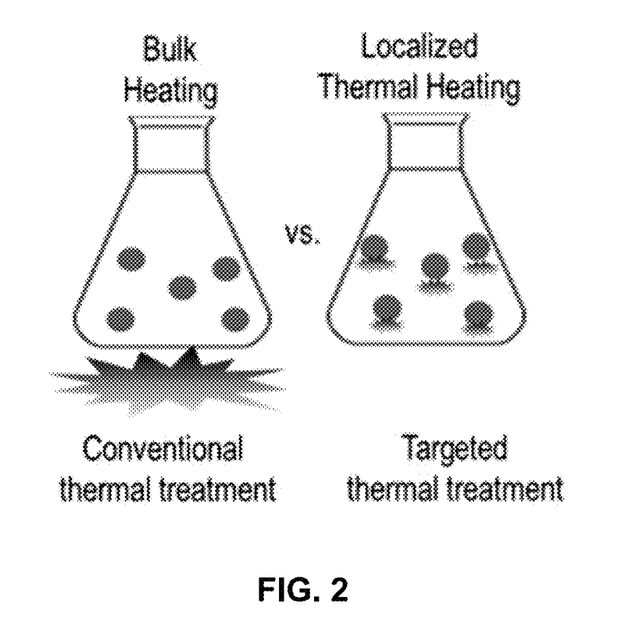
FIG. 2 schematically compares bulk heating to localized thermal heating as is possible by use of disclosed composite nanoparticles.

The composite nanoparticles include a first material that can absorb energy provided in a non-contact fashion and efficiently convert and re-emit at least a portion of that absorbed energy as thermal energy. The non-contact energy absorption and conversion capability of this material allows for heat generation of the system to be highly localized and better controlled as compared to hydrogen storage materials that are conventionally heated in a bulk thermal treatment approach. As schematically illustrated in FIG. 2, conventional heating (left) occurs from the application of thermal energy to the outside of a storage facility or container and bulk transport of the thermal energy toward the center of the contents held in the container, leading to an increase in temperature of the total internal environment and the surroundings. In localized thermal heating as shown in the right panel of FIG. 2, heating can be carried out with each composite nanoparticle acting as is its own source of heat, controlled by the non-contact absorption of energy in a non-thermal form, and as such, the surroundings are minimally heated, as the non-thermal energy source will heat only the particles with limited heating of the surroundings. This leads to a smaller energy footprint for a system as well as much greater control of the heating.

In one embodiment, the composite nanoparticles can include a magnetic material. In general, any magnetic material capable of absorbing energy in the presence of an alternating magnetic field and re-emitting at least a portion of that energy as heat is encompassed, as demonstrated in FIG. 3. For instance, a magnetic material can include, but is not limited to, rare earth metals such as gadolinium, terbium, dysprosium, holmium, etc.; transition metals such as iron, nickel, cobalt, magnesium, etc.; noble metals such as rhodium, palladium, etc. In one embodiment, the magnetic material can include at least one of iron, nickel, and cobalt.

Examples of magnetic materials include those including Fe, Ni, Co, NiCo, FeZn, borides of these materials, ferrites, rare-earth metals, or alloy combinations thereof. The magnetic materials can be present in any suitable form including, without limitation in the form of oxides, compositions, combinations, solid dispersions, and alloys, such as $Gd_5Si_4$, $Gd_5Si_{2.06}Ge_{1.94}$, $Gd_7Pd_3$; $MnFeP_{0.35}As_{0.65}$ and MnAs.

In one particular embodiment, an iron-based magnetic material including $Fe^{2+}$ and/or $Fe^{3+}$ can be utilized in a suitable form including, but not limited to, compositions, complex oxides, alloys, solid dispersions and other combinations, for instance with elements of Group IV, including but not limited to lead, zirconium, titanium, tin, optionally doped by small amounts of the elements of the III and V groups, such as scandium and niobium.

The composite nanoparticles can include a plasmonic material capable of absorbing energy in the presence of a suitable electromagnetic wave and re-emitting at least a portion of that energy as heat. In one embodiment, the composite nanoparticles can include either a magnetic material or a plasmonic material, but the composite nanoparticles are not limited to this and can optionally include a combination of different types of energy absorbing materials (e.g., both magnetic and plasmonic) as well as multiple examples one or both types of energy absorbing materials (e.g., one or more magnetic materials and/or one or more plasmonic materials).

Plasmonic materials generally include at least one of gold, platinum, silver, aluminum, copper, or another noble metal. Plasmonic nanoparticles are capable of coupling with electromagnetic radiation (e.g., in the near infrared (e.g., about 700 nm to about 1 mm) or visible (e.g., about 400 nm to about 700 nm) wavelength) for localized heating. The effect of electromagnetic waves of a suitable wavelength upon the nanoparticles is such that a resonant oscillation of the electrons is activated in the nanoparticles (plasmons), which, due to their small size, then dissipate the energy as heat into the local environment. The plasmonic resonance can be tuned through modification of the size, shape, morphology, plasmonic material and additional materials of the particles (e.g., a gold or silver coating on a core) to react to specific wavelengths of electromagnetic radiation. For instance, gold and silver nanoparticles will typically have resonance peaks in the visible-near IR spectrum, whereas gold-coated silicon nanoparticles can be tuned to resonate when excited by Near Infra-Red (NIR) radiation.

Nanosized particles coupled to a magnetic and/or plasmonic material can be prepared using any of a variety of known technologies. For example, nanoparticles can be formed by the plasma method in inert medium (for example, under argon) from particles of a larger initial size, for example, 50-100 microns, by templated growth methodologies, by ionic deposition and growth methodologies, by chemical reduction, etc.

In conjunction with the energy absorbing magnetic or plasmonic material, the composite nanoparticles also include a hydrogen absorbing material that can absorb and release hydrogen according to a thermal control mechanism.

In one embodiment, the reversible hydrogen absorbing material can be one that is capable of forming a metal bond with hydrogen according to an interstitial hydride formation methodology.

In general, the hydrogen absorbing material can be a crystalline or amorphous material formed of any metal or metal alloy capable of reversibly storing hydrogen within the matrix. By way of example, the reversible hydrogen absorbing material can include, without limitation, an element chosen from Group IA alkali metals, Group IIA alkali earth metals, Group IIIB lanthanides, or Group IVB transition metals. In one embodiment, the hydrogen absorbing material can include a transition metal capable of forming a reversible binary metal hydride including, without limitation, palladium, titanium, zirconium, hafnium, zinc, and/or vanadium.

Multi-component metal alloys are also encompassed as reversible hydrogen absorbing materials and can include, without limitation, combinations of Group IV elements with Group V through Group XI elements (based on the 1990 IUPAC system in which the columns are assigned the numbers 1 to 18) as well as alloys including combinations of lanthanides (atomic numbers 58 to 71) with Group VII through Group XI elements. For example; the hydrogen absorbing material can have the structure $A_xT_y$, in which A can be one or more Group IV elements and T can be one or more Group V through Group XI elements. In some embodiments, a Group VI metal can be selected from Mo and W, and a Group VIII metal can be selected from Fe, Co, Ni, Pd, and Pt. In some embodiments, a Group VI metal can be Mo and a Group VIII metal can be selected from Co and Ni.

In another embodiment, the hydrogen absorbing material can have a compositional formula of $$A_{1-x}M_xT_{5-y-z}B_yC_z,$$

wherein:
A=is an alloy of rare earth elements, typically including cerium and lanthanum;
M=La, Pr, Nd or Ce;
T=Ni;
B=Co;
C=Mn, Al or Cr;
x=0.0 to 1.0;
y=0.0 to 2.5; and
z=0.0 to 1.0.

The hydrogen absorbing material can be selected to have a desired lattice structure and thermodynamic properties such as to control the pressure and/or temperature at which it can absorb and desorb hydrogen. These working thermodynamic parameters can be modified and fine-tuned by an appropriate alloying method and as such, the composition of the composite nanoparticles can be designed for use in a particular process.

The hydrogen absorbing material and the magnetic or plasmonic materials are combined such that the two are in thermal communication with one another, i.e., thermal energy radiated from the magnetic or plasmonic material can be transferred to the hydrogen absorbing material leading to a temperature increase and thereby facilitating desorption of stored hydrogen. As such, the materials can be in direct or indirect contact with one another and combined in any morphology or fashion so as to maintain the thermal communication. For instance, in one embodiment, the composite materials can be provided as core/shell composite nanoparticles in which the shell material either partially or completely covers the core material. The particular arrangement of the materials is not critical, as long as each is capable of carrying out the desired function. For instance, the core of a core/shell composite nanoparticle can be formed of either the hydrogen absorbing material or the magnetic or plasmonic material, as long as each component can carry out the desired function (e.g., hydrogen can reach and be absorbed by the hydrogen absorbing material).

In one embodiment, the magnetic or plasmonic nanoparticles can be first formed and the hydrogen absorbing material can be deposited on all or on a portion of the surface of the nanoparticles, for instance via a wet chemistry formation process as described further in the examples section below.

The energy absorption and localized heating provided by the magnetic or plasmonic materials can be self-controlled based on characteristics of the particles themselves in addition to modification of aspects of the input energy (magnetic field strength, electromagnetic wavelength, etc.). For instance, the heating characteristics of a magnetic nanoparticle can be controlled according to the Curie temperature of the magnetic material. Non-contact heating of the composite nanoparticles can be controlled by altering the nanoparticle composition, size, shape and/or concentration in the local area. Depending upon the composition and morphology of the particular materials included in the composite nanoparticles, the heating characteristics of the energy absorbing material may or may not vary with the presence or amount of the hydrogen absorbing material. For instance, the heating characteristics of a magnetic nanoparticle may be independent of the presence of a metallic domain that functions as the hydrogen absorbing material.

The tunability of the composite nanoparticles allows selective control of the input energy (the magnetic field strength or the wavelength of electromagnetic radiation) required to cause the nanoparticles to heat the local area. For instance, at least one of the size and shape of the composite nanoparticles as well as the particulars of the magnetic or plasmonic material incorporated in the composite nanoparticles may be configured to particular design specification. For instance, when considering nanoparticles that include a plasmonic material, the size, shape, and other characteristics of the nanoparticles can be configured such that the composite nanoparticles exhibit the desired plasmon resonance when exposed to one or more of ultraviolet, visible and infrared radiation. For example, when considering non-spherical plasmonic nanoparticles, the heating characteristics can vary depending upon the alignment of an axis of the particles with a polarization axis of the incident electromagnetic radiation. As such, the shape and arrangement of the nanoparticles can be controlled so as to utilize this dependence to advantage in system design.

Figure 3:
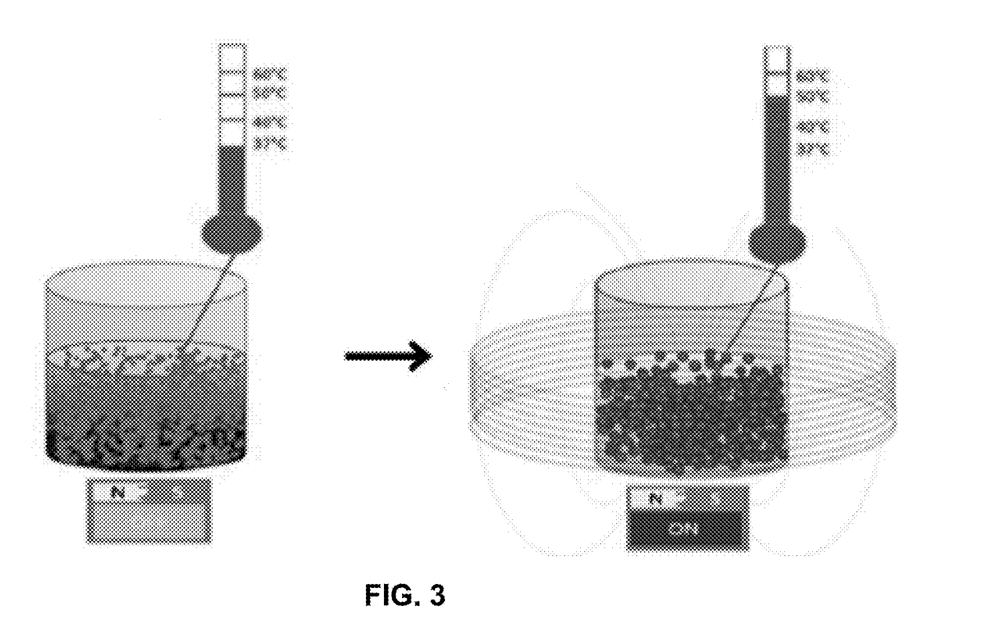
FIG. 3 illustrates a system during which heat produced by absorption of energy by the magnetic or plasmonic component of a composite nanoparticle can be used to heat a hydrogen absorbing component of the composite nanoparticle and thereby release absorbed hydrogen.

FIG. 3 illustrates one system that contains magnetic-based composite nanoparticles. As shown, when the system is not placed under a magnetic field, as in the left panel, the temperature of the nanoparticles is low and hydrogen can be stored as an interstitial hydride in the hydrogen absorbing material of the composite nanoparticles. In the presence of an oscillating magnetic field (right panel), the magnetic nanoparticles can act as a local "hot-spot" to heat up the surrounding environment via hysteresis loss or relaxation mechanisms. This occurs because the magnetic moments of the nanoparticles change direction to line up with the external field, which can cause local heating. This change of direction can take place two different ways: Brownian relaxation, where the nanoparticle physically rotates so the moment lines up with the external field, and Neel relaxation, where the particle is stationary, but the magnetic moment rotates in the fixed lattice. A plasmonic-based system can function in a similar fashion with electromagnetic radiation of a predetermined wavelength utilized as the energy source.

By use of disclosed systems, heat delivered from the magnetic or plasmonic material to the hydrogen absorbing material can be modulated by suitable selection of characteristics of the alternating electromagnetic or plasmonic field, such as amplitude and frequency of the alternating magnetic field, shape of the magnetization curve, plasmonic field power, etc. Further system control can be obtained through placement of the composite nanoparticles with respect to the non-contact energy source. For instance, the composite nanoparticles can be selectively placed in regions where heat is necessary and energy input can be adjusted to generate the desired amount of heat in a controlled manner.

In one embodiment, the hydrogen absorbing material can show variation in absorption and/or desorption characteristics with regard to different isotopes of hydrogen. For instance, and as described further in the examples below, a hydrogen absorbing material, such as palladium, can exhibit selectivity of desorption of hydrogen vs. tritium based upon the temperature and/or pressure of the system. As such, by controlling the desorption characteristics of the system, e.g., the pressure and/or temperature of the system, one of the hydrogen isotopes can be selectively desorbed over the other. This can be beneficially utilized to separate the hydrogen isotopes. Likewise, the hydrogen isotopes can show preferential absorption characteristics depending upon a characteristic of the system, e.g., temperature as controlled by field strength, etc. In this embodiment, one isotope can show preferential absorption characteristics, and the isotopes can be separated at this stage of a separation process.

The present disclosure may be better understood with reference to the Examples set forth below.

EXAMPLE 1

Figure 4:
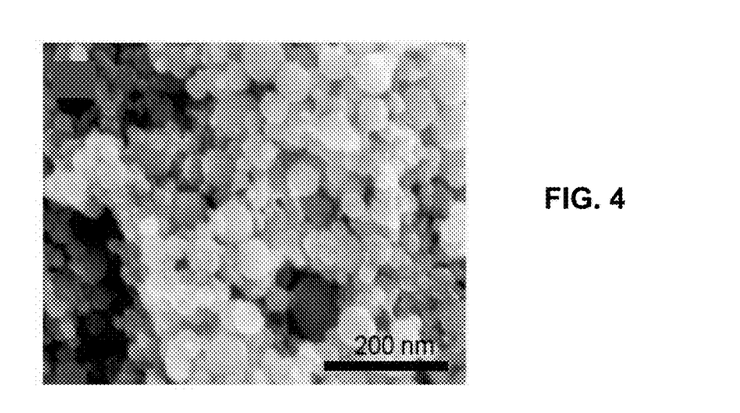
FIG. 4 is a scanning electron microscope (SEM) image of $Fe_2O_3$ spheres used in formation of composite nanoparticles.
Figure 5:
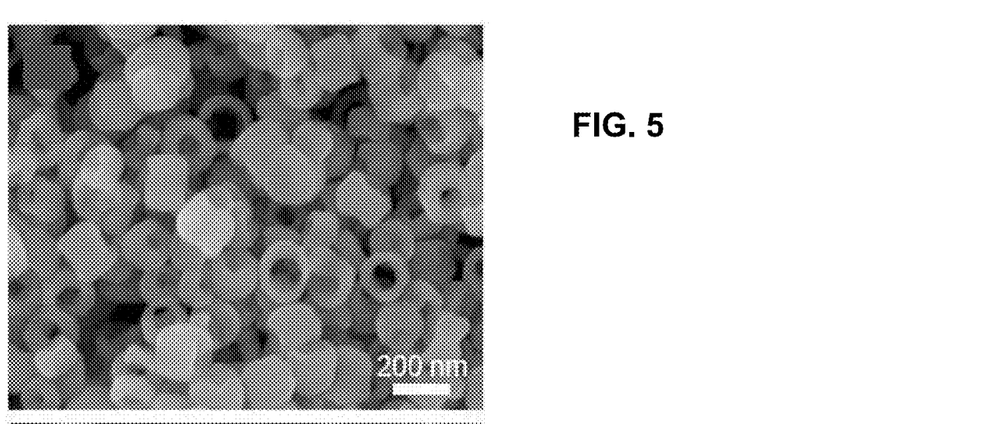
FIG. 5 is an SEM image of $Fe_2O_3$ tubes used in formation of composite nanoparticles.
Figure 6:
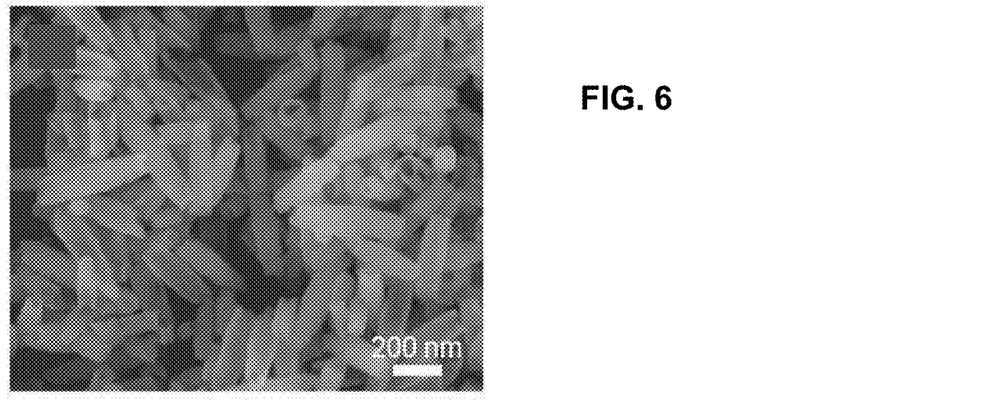
FIG. 6 is an SEM image of $Fe_2O_3$ wires used in formation of composite nanoparticles.

Hybrid $Fe_2O_3$—Pd nanoparticle conjugates were prepared for magnetically induced hydrogen release. The $Fe_2O_3$ provided magnetic functionality whereas the Pd provided hydrogen absorption. $Fe_2O_3$ nanoparticles were utilized as purchased. FIG. 4-FIG. 6 illustrate $Fe_2O_3$ spheres (FIG. 4), tubes (FIG. 5), and wires (FIG. 6) used to form composite nanoparticles.

Figure 7:
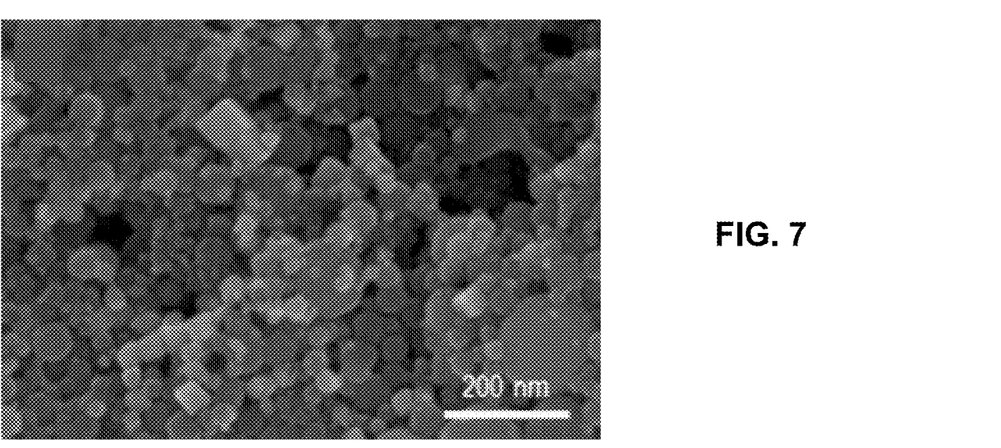
FIG. 7 is an SEM image of $Fe_2O_3$—Pd composite nanoparticles.

Pd regions were synthesized on the $Fe_2O_3$ nanoparticles using a wet chemical approach at ambient conditions. Briefly, 0.125 mmoles $Fe_2O_3$, 0.08 mmol CTAB, 0.12 mmoles $NaPdCl_4$ in 20 mL $diH_2O$ was heated to 80° C. before 0.14 mmoles L-ascorbic acid was added and the solution turned black. The solution was heated at 80° C. for 30 minutes before being cooled and magnetically purified three times. The final $Fe_2O_3$—Pd materials were suspended in water. FIG. 7 is an SEM image of the $Fe_2O_3$—Pd composite nanoparticles.

Figure 8:
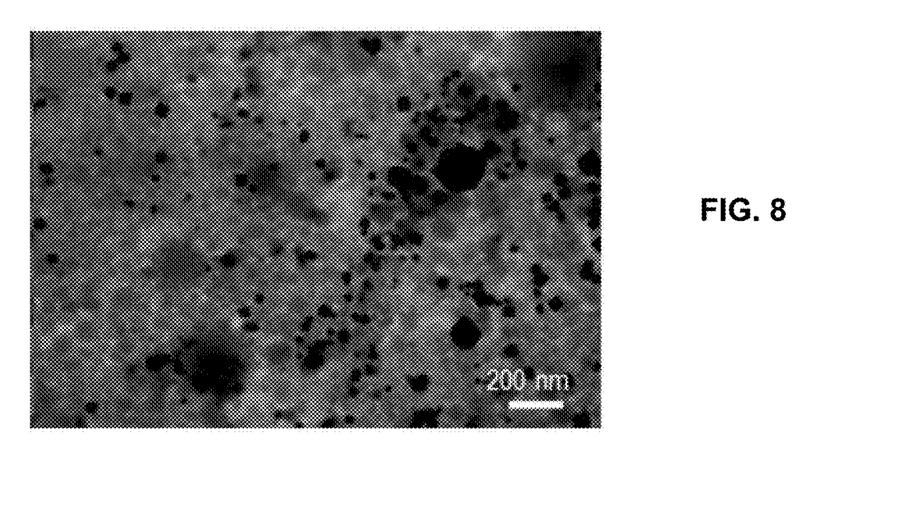
FIG. 8 is an SEM backscattering image of the $Fe_2O_3$—Pd composite nanoparticles of FIG. 7.
Figure 9:
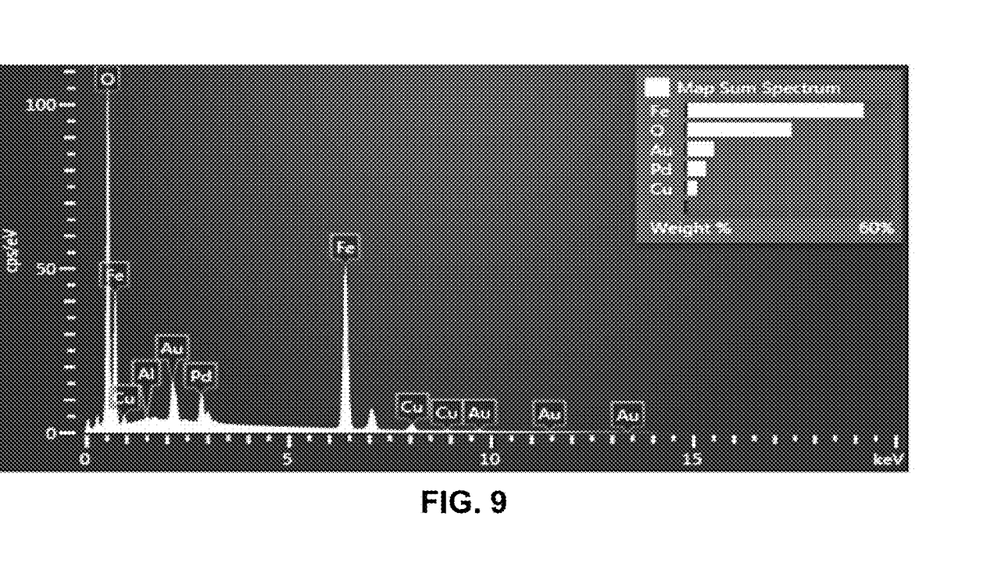
FIG. 9 illustrates an energy dispersive X-ray (EDX) analysis of the $Fe_2O_3$—Pd composite nanoparticles of FIG. 7.

Pd was successfully grafted onto $Fe_2O_3$ spheres as indicated by SEM backscattering image (FIG. 8) in which darker regions indicate the presence of the Pd, and EDX measurements (FIG. 9).

Table 1, below, provides the quantitative weight percent measurements obtained from the EDX analysis. The K, L, and M symbols refer to the atomic shell that the ejected electrons originated from. This is standard X-ray notation for the atomic principle energy level (K=1, L=2, M=3 etc).

TABLE 1

| Element | Weight % |
|---------|----------|
| C K     | 1.59     |
| O K     | 0.96     |
| Al K    | 0.18     |
| Fe K    | 0.60     |
| Cu L    | 1.53     |
| Pd L    | 12.86    |
| Au M    | 0.19     |
| Total   | 17.93    |

EXAMPLE 2

Figure 10:
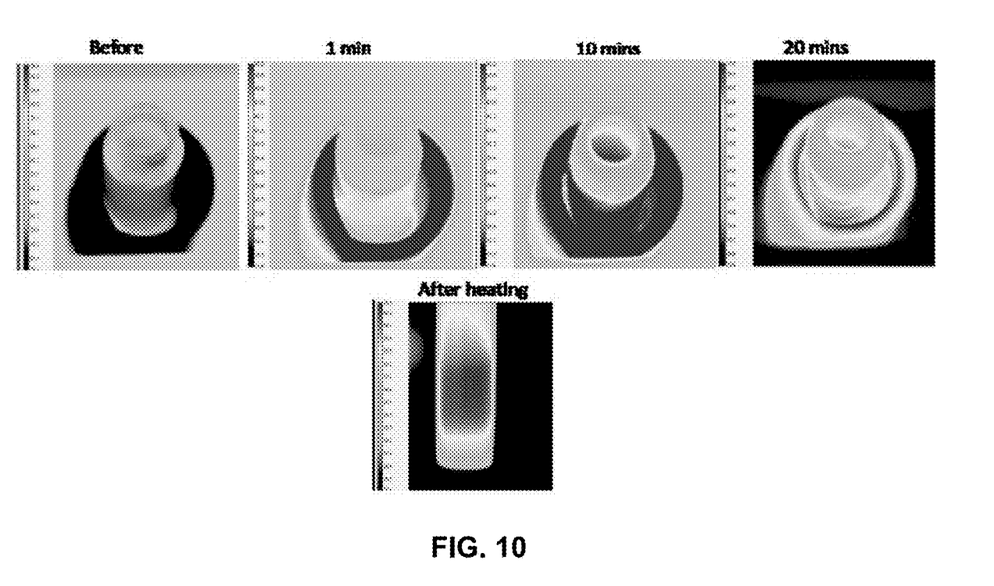
FIG. 10 presents infrared thermal imaging of $Fe_2O_3$ nanoparticles prior to, during, and following heating for 20 minutes by an alternating magnetic field.

Magnetic and composite magnetic nanoparticles were examined for non-contact absorption of magnetic energy and subsequent release thereof as heat. To that end, suspensions of $Fe_2O_3$ and $Fe_2O_3$-metal conjugates were placed in a magnetic field using a 425 kHz water cooled copper coil and the temperature increase in the presence of the magnetic field was measured. FIG. 10 shows the evolution of the heat in a vial of $Fe_2O_3$ nanoparticles using infrared thermal imaging. The images were taken prior to being placed in a magnetic field and then 1 minute, 10 minutes, and 20 minutes after heating as shown in FIG. 10. The lower image presents a side view of the vial after 20 minutes of heating. As shown, following heating, the hottest (darkest on FIG. 10) point of the vial was in the middle, where most of the nanoparticles had accumulated and it had reached about 63° C.

Figure 11:
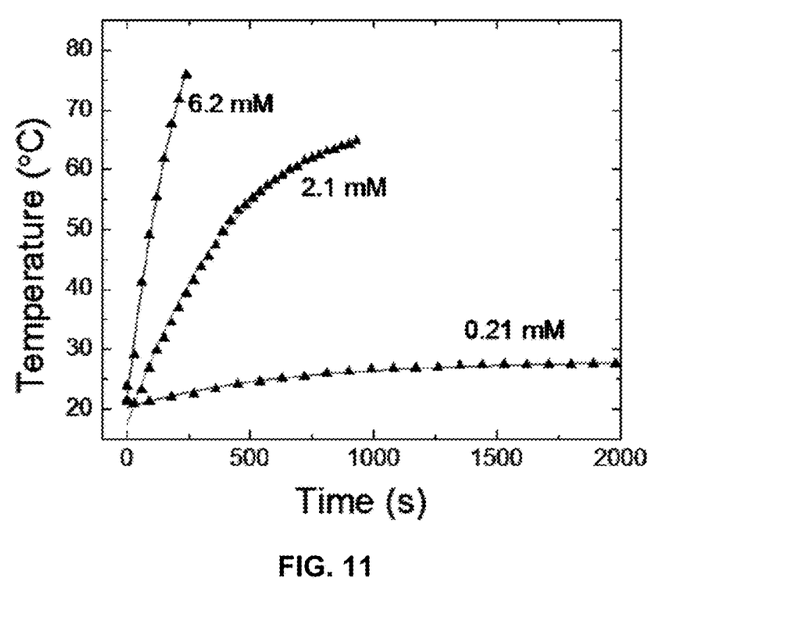
FIG. 11 illustrates the effect of nanoparticle concentration on magnetic heating characteristic of a suspension of composite nanoparticles.
Figure 12:
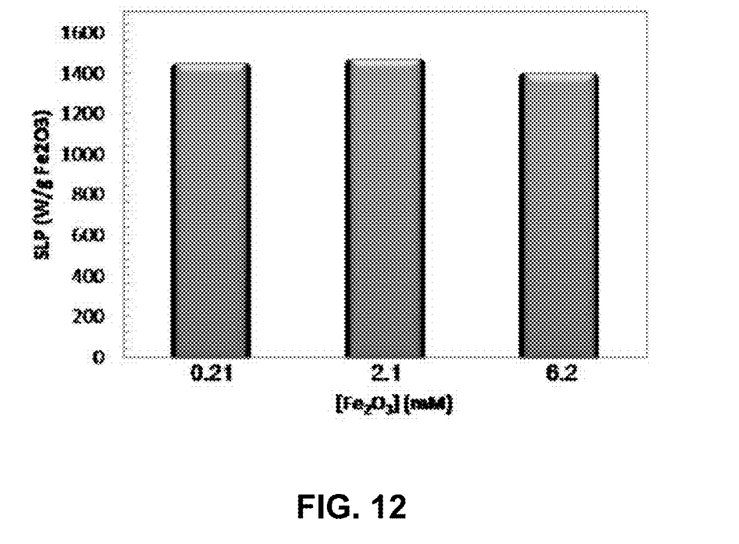
FIG. 12 illustrates the effect of nanoparticle concentration on the specific power loss of a suspension of composite nanoparticles.

Effect of variation in nanoparticle concentration on heating rate and ultimate temperature attained as well as specific power loss of the system was also examined. Results are shown in FIG. 11 and FIG. 12. As shown, the concentration of the $Fe_2O_3$ nanoparticles affected the temperature reached by the solution (FIG. 11) but didn't affect the efficiency of heating, as indicated by the calculation of the specific loss power (SLP) (FIG. 12).

Figure 13:
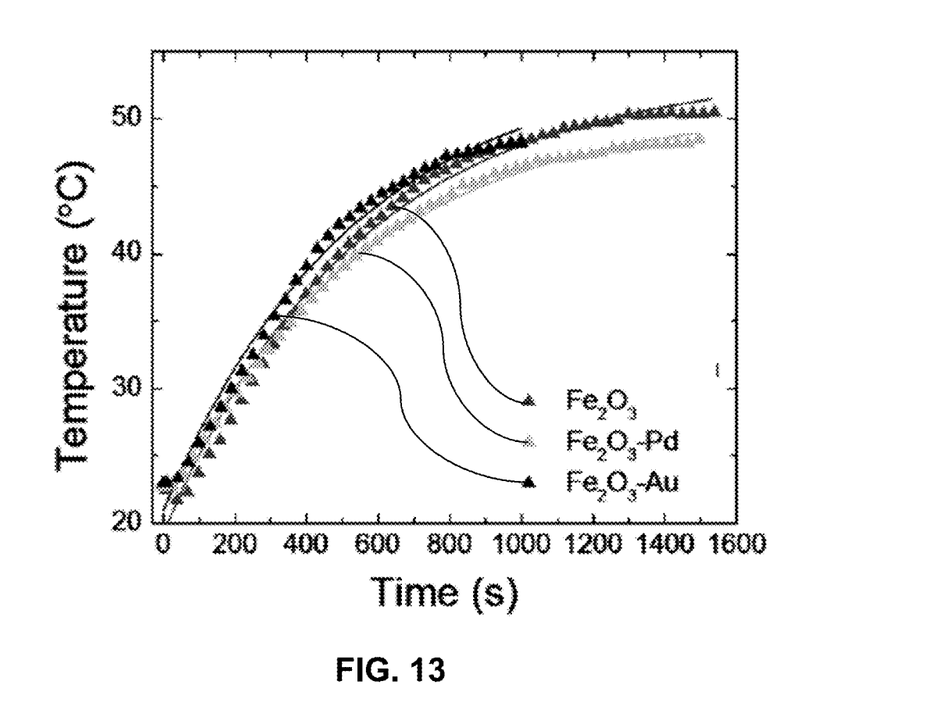
FIG. 13 illustrates the effect of nanoparticle composition on magnetic heating characteristics of a suspension of the nanoparticles.
Figure 14:
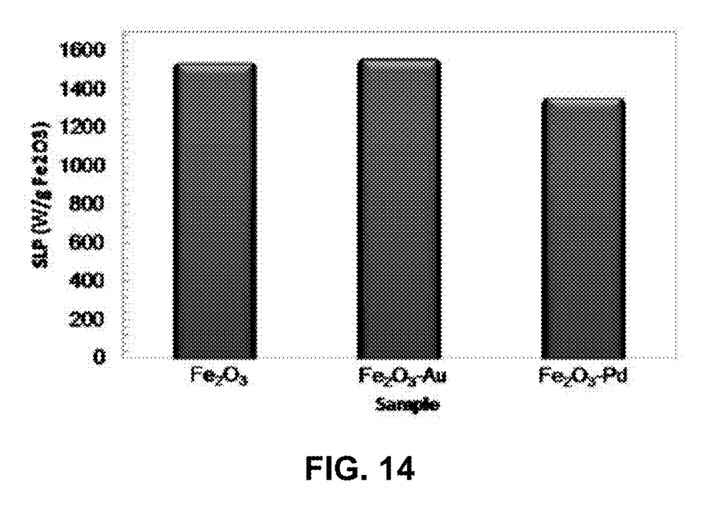
FIG. 14 illustrates the effect of nanoparticle composition on the specific power loss of a suspension of the nanoparticles.

The effect of the metal island growth on the magnetic hyperthermia of $Fe_2O_3$ nanoparticles was also investigated. As shown in FIG. 13, the temperature was not affected by the growth of different metal domains including a Pd metal domain and an Au metal domain. As shown in FIG. 14, the SLP remained unchanged with the growth of the gold domain, but decreased slightly for the $Fe_2O_3$—Pd sample, indicating a slight loss of heating efficiency. This could be due to loss of $Fe_2O_3$ (either through sample preparation or NP etching) compared to the $Fe_2O_3$—Au sample, from the growth of the Pd onto the $Fe_2O_3$, or from more heat loss compared to the other samples.

Figure 15:
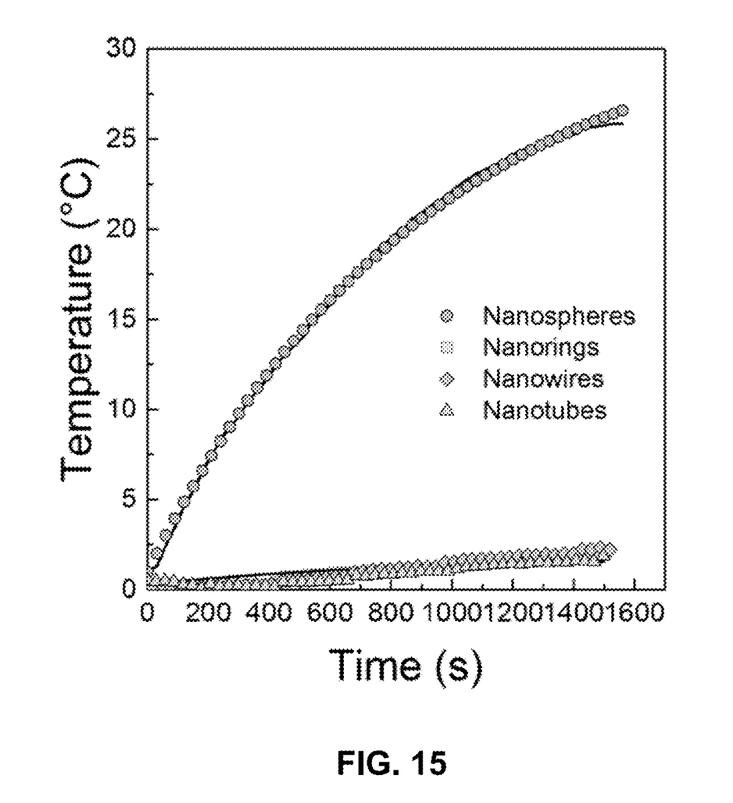
FIG. 15 illustrates the effect of nanoparticle shape on magnetic heating characteristic of a suspension of the nanoparticles.

The effect of nanoparticle shape on magnetic hyperthermia was also investigated. Results are shown in FIG. 15. The $Fe_2O_3$ spheres heated up significantly in the magnetic field, whereas the tubes, rings and wires showed a minimal (2.5° C.) increase in temperature in the magnetic field.

EXAMPLE 3

Figure 16:
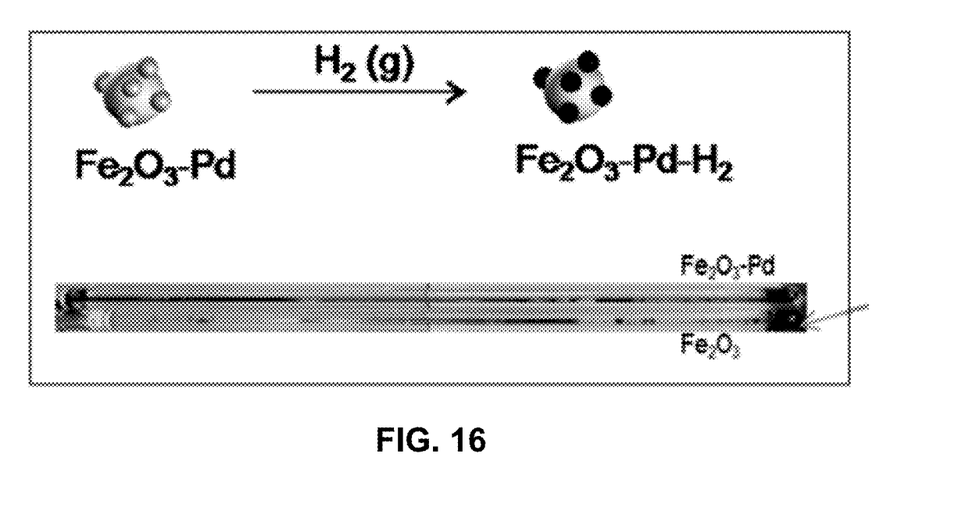
FIG. 16 schematically illustrates the hydrogen loading approach for loading hydrogen onto the composite nanoparticles.

$Fe_2O_3$—Pd composite nanoparticles formed as described above were examined to confirm that absorbed hydrogen could be released in a controlled manner when placed in a magnetic field by simply changing the experimental conditions, e.g. magnetic field strength. For these experiments, $Fe_2O_3$—Pd composite nanoparticles were loaded into capillary tubes by depositing the nanoparticles on the interior walls of the capillaries as a thin layer. As such, the nanoparticles did not fill the capillary. Each capillary was loaded with approximately 20 mg of the composite nanoparticles having a weight ratio of Pd to Fe of 0.6. The capillary tubes had a length of 20.3 cm and a volume of 0.101 cm³. Following deposition of the nanoparticles on the interior surface of the capillaries, the nanoparticles were loaded with hydrogen by flowing H₂ gas through the capillaries. In these studies, $Fe_2O_3$ particles loaded into separate capillaries were used as a control. FIG. 16 schematically illustrates the hydrogen loading approach and an image of $Fe_2O_3$—Pd and control $Fe_2O_3$ capillaries. The arrow in FIG. 16 is pointing to the capillaries in which material was deposited.

Figure 17:
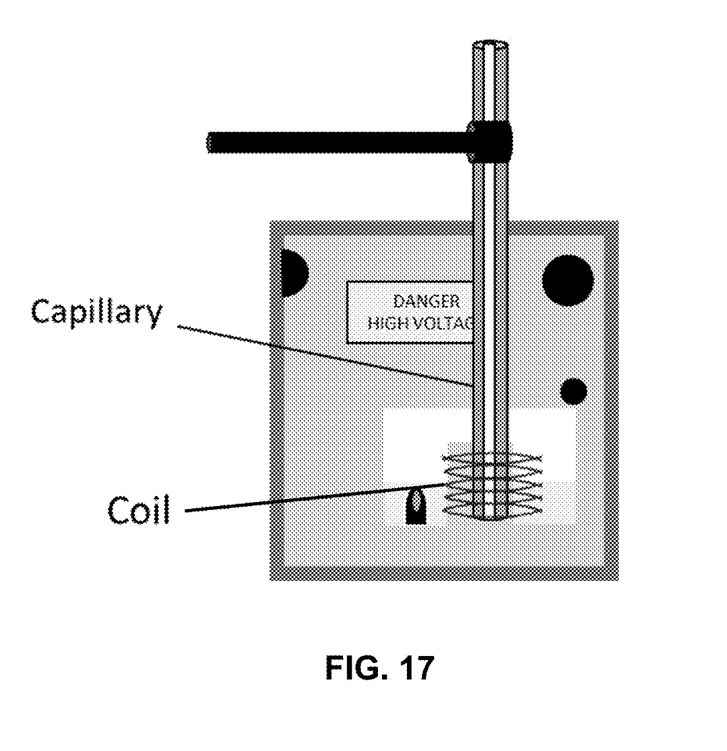
FIG. 17 is a photograph shown a capillary loaded with nanoparticles configured for exposure to a magnetic field.

Following H₂ loading, the capillaries were placed in a coil as described above that exposed them to an alternating magnetic field as shown in FIG. 17.

Figure 18:
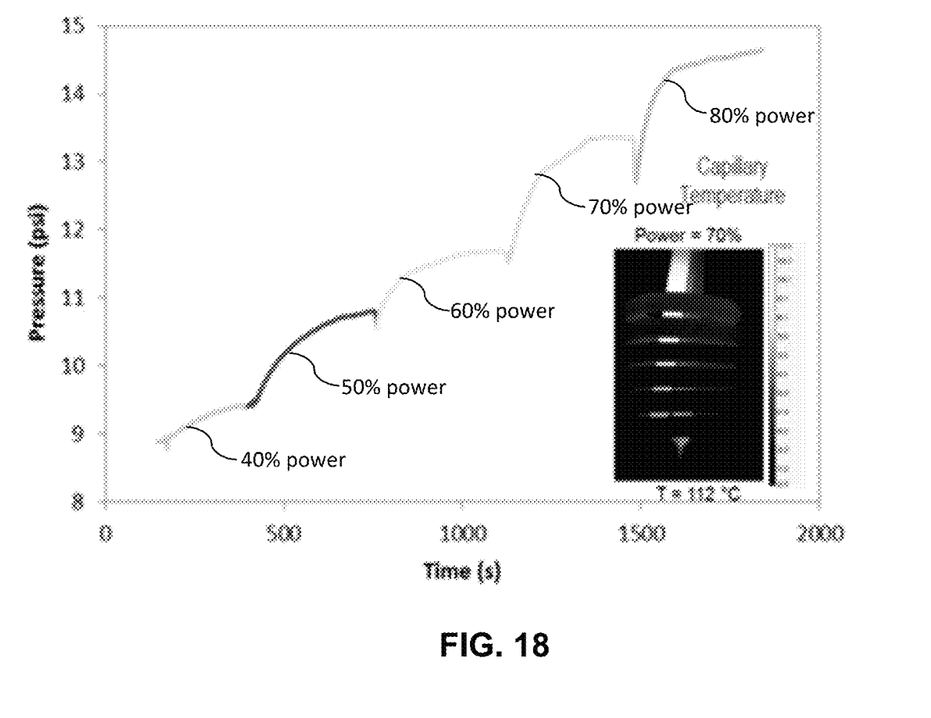
FIG. 18 illustrates the effect of magnetic field strength on hydrogen release characteristics as determined by measurement of hydrogen gas pressure for a capillary loaded with $Fe_2O_3$—Pd composite nanoparticles.

The change in pressure in a capillary containing hydrogen (H₂) loaded $Fe_2O_3$—Pd composite nanoparticles was measured at various magnetic field strengths as a measure of hydrogen release from the nanoparticles. As shown in FIG. 18, the H₂ release increased (as determined by increasing pressure) with increasing magnetic field strength. The temperature of the capillary was measured using infrared thermal imaging. The inset of FIG. 18 illustrates an infrared thermal image of a capillary during heating held in a coil at 70% power (Current=13.3 A, T=112° C.). These data show that the rate of hydrogen release could be controlled by altering the strength of the magnetic field.

The strength of the magnetic field was calculated using the following equation:

$$B = \mu n I$$

in which
B=magnetic field strength
$\mu$=permeability ($1.26 \times 10^{-6}$ H/m for Cu coil)
n=turns/meter (6 turns in 3.4 cm; n=133 turns/m)
I=current (Amps)

Table 2, below provides the calculated magnetic field strengths and initial hydrogen release rate at the different power levels examined:

TABLE 2

| Power (%) | Current (A) | B (Tesla) | B (Gaussians) | Initial rate (psi/s) |
|---|---|---|---|---|
| 40 | 2.4 | $4.02 \times 10^{-4}$ | 4.02 | $3.20 \times 10^{-3}$ |
| 50 | 6.4 | $1.07 \times 10^{-3}$ | 10.7 | $1.25 \times 10^{-2}$ |
| 60 | 9.9 | $1.66 \times 10^{-3}$ | 16.6 | $1.52 \times 10^{-2}$ |
| 70 | 13.3 | $2.23 \times 10^{-3}$ | 2.23 | $2.01 \times 10^{-2}$ |
| 80 | 16.3 | $2.73 \times 10^{-3}$ | 27.3 | $3.56 \times 10^{-2}$ |

Figure 19:
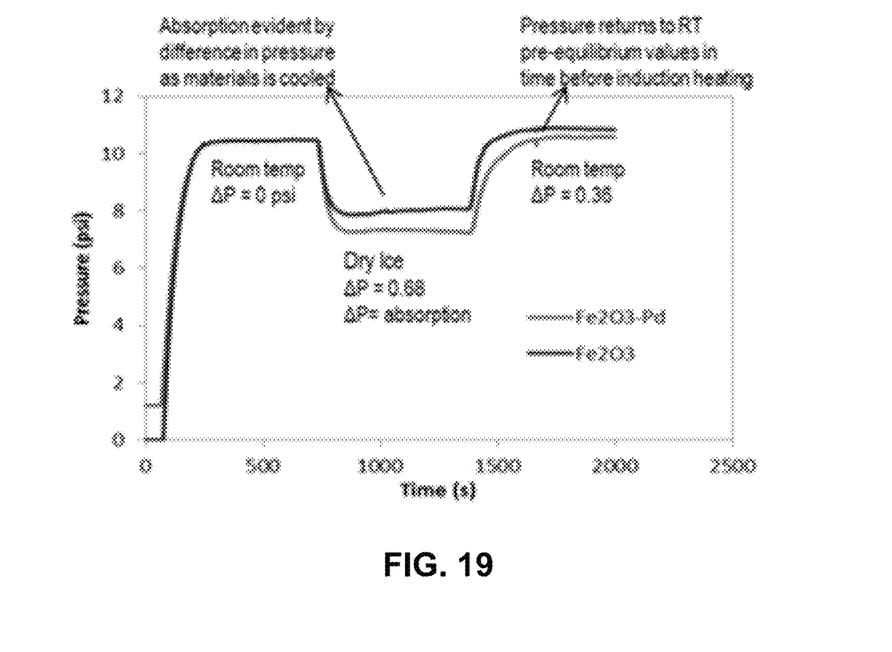
FIG. 19 illustrates the effect of temperature on pressure of a composite nanoparticle system in the presence of hydrogen as compared to a control nanoparticle system.

The effect of temperature on H₂ pressure was measured in the capillaries using a pressure transducer. As shown in FIG. 19, the pressure of the two capillaries (composite and control) decreased when the temperature was decreased using dry ice (T~−78° C.). The difference in pressure for the $Fe_2O_3$—Pd nanoparticle loaded capillary compared to the $Fe_2O_3$ nanoparticle loaded capillary is evidence that there is hydrogen absorption by the composite nanoparticles. The capillaries were allowed to reach room temperature and the final pressure of the $Fe_2O_3$—Pd nanoparticle loaded capillary was lower than the $Fe_2O_3$ control. Repeat measurements show that the absorption and desorption was reversible and consistent.

Figure 20:
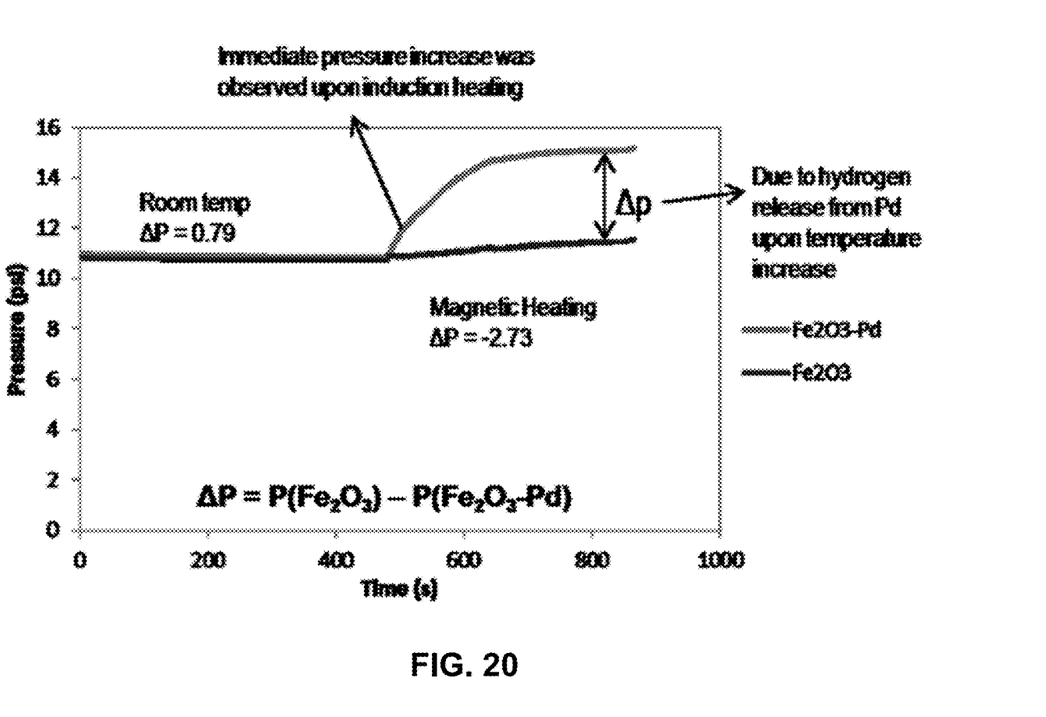
FIG. 20 illustrates hydrogen gas desorption by use of magnetic induction heating from $Fe_2O_3$—Pd composite nanoparticles as compared to control $Fe_2O_3$ nanoparticles.

FIG. 20 shows the hydrogen release of the samples in using an alternating magnetic field as the heat source. The pressure of the $Fe_2O_3$—Pd composite nanoparticle loaded capillary increased while the $Fe_2O_3$ nanoparticle loaded capillary remained constant, showing that the $Fe_2O_3$—Pd composite nanoparticles were able to absorb and release hydrogen using an alternating magnetic field.

Hydrogen absorption and release studies were measured using a magnetic induced hyperthermia setup that was attached to a residual gas analyzer (RGA) to determine the components in the gas. In aqueous studies, steam was produced when the nanoparticles were exposed to an alternating magnetic field, proving that the nanoparticles were heating in response to the magnetic energy. In aqueous studies, the temperature increase was measured using a fiber optic temperature probe.

EXAMPLE 4

Figure 21:
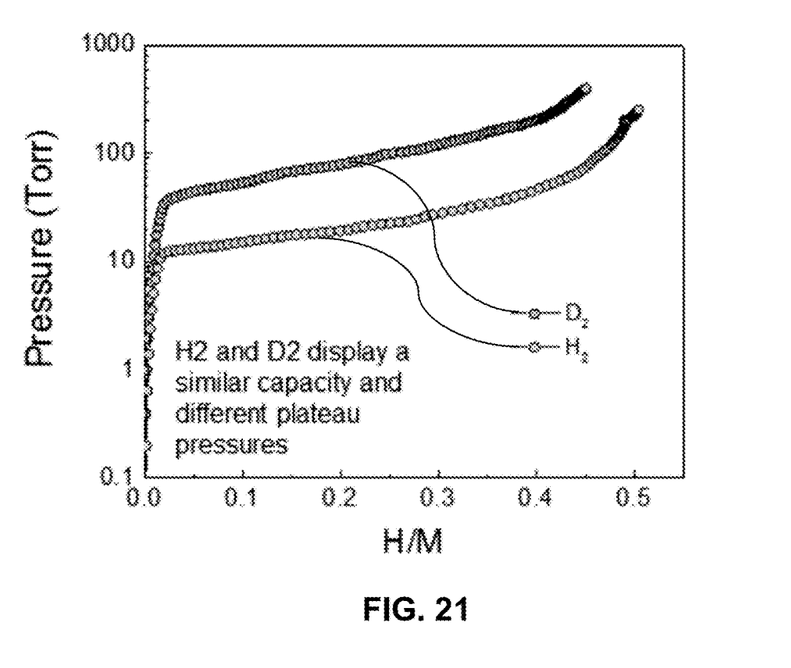
FIG. 21 illustrates the variation in hydrogen desorption characteristics from composite nanoparticles for different hydrogen isotopes.

$Fe_2O_3$—Pd composite nanoparticles formed as described above were examined for differential hydrogen absorption/desorption based upon hydrogen isotope. As shown in FIG. 21, H₂ and D₂ displayed a different plateau pressure and different absorption capacities for the same composite nanoparticles and under the same magnetic field. As such, disclosed materials can be utilized in separation of hydrogen isotopes.

While certain embodiments of the disclosed subject matter have been described using specific terms, such description is for illustrative purposes only, and it is to be understood that changes and variations may be made without departing from the spirit or scope of the subject matter.

What is claimed is:

1. A method for releasing hydrogen from a reversible hydrogen absorbing material by delivering energy to a bed of multi-functional nanoparticles, the multi-functional nanoparticles comprising an energy absorbing material that includes at least one of a magnetic material and a plasmonic material, the multi-functional nanoparticles further comprising hydrogen held by a reversible hydrogen absorbing material that is in thermal contact with the energy absorbing material, wherein the hydrogen comprises multiple isotopes of hydrogen, the reversible hydrogen absorbing material comprising one or more of an alkali metal, an alkali earth metal, a lanthanide, or a transition metal, the energy being delivered via at least one of an alternating magnetic field and an electromagnetic wave, wherein upon the delivery, the energy absorbing material emits thermal energy and hydrogen is released from the reversible hydrogen absorbing material, wherein a first isotope of hydrogen is released from the reversible hydrogen absorbing material at a first release condition and a second isotope of hydrogen is released from the reversible hydrogen absorbing material at a second, different release condition, the method including varying the first and second conditions and thereby selectively releasing the first isotope and separating the first isotope from the second isotope.

2. The method of claim 1, further comprising following release of the hydrogen feeding additional hydrogen to the bed, the hydrogen absorbing material absorbing the additional hydrogen.

3. The method of claim 2, further comprising repeating the release and absorption cycle.

4. The method of claim 1, further comprising varying a characteristic of the energy delivery to control the rate or amount of the hydrogen release.

5. The method of claim 4, wherein the characteristic comprises varying the field strength of the alternating magnetic field.

6. The method of claim 1, wherein the hydrogen is held by the reversible hydrogen absorbing material in the form of a metal hydride.

7. The method of claim 1, wherein the reversible hydrogen absorbing material comprises one or more of palladium, titanium, zirconium, hafnium, zinc, or vanadium.

8. The method of claim 1, wherein the reversible hydrogen absorbing material comprises a compositional formula of:

$$A_{1-x}M_xT_{5-y-z}B_yC_z,$$

wherein:
A comprises lanthanum;
M=La, Pr, Nd or Ce;
T=Ni;
B=Co;
C=Mn, Al or Cr;
x=0.0 to 1.0;
y=0.0 to 2.5; and
z=0.0 to 1.0.

9. A method for releasing hydrogen from a reversible hydrogen absorbing material by delivering energy to a bed of multi-functional nanoparticles, the multi-functional nanoparticles comprising an energy absorbing material that includes at least one of a magnetic material and a plasmonic material, the multi-functional nanoparticles further comprising hydrogen held by a reversible hydrogen absorbing material that is in thermal contact with the energy absorbing material, the energy being delivered via at least one of an alternating magnetic field and an electromagnetic wave, wherein upon the delivery, the energy absorbing material emits thermal energy and hydrogen is released from the hydrogen absorbing material, wherein the hydrogen comprises multiple isotopes of hydrogen, wherein a first isotope of hydrogen is released from the hydrogen absorbing material at a first release condition and a second isotope of hydrogen is released from the hydrogen absorbing material at a second, different release condition, the method including varying the first and second conditions and thereby selectively releasing the first isotope and separating the first isotope from the second isotope.

10. The method of claim 9, further comprising following release of the first isotope of hydrogen, feeding additional hydrogen to the bed, the hydrogen absorbing material absorbing the additional hydrogen.

11. The method of claim 10, further comprising repeating the release and absorption cycle.

12. The method of claim 9, further comprising varying a characteristic of the energy delivery to control the rate or amount of the hydrogen release.

13. The method of claim 12, wherein the energy being delivered comprises energy delivered via an alternating magnetic field, and the characteristic comprises varying the field strength of the alternating magnetic field.

14. A method for releasing hydrogen from a reversible hydrogen absorbing material by delivering energy to a bed of multi-functional nanoparticles, the multi-functional nanoparticles comprising an energy absorbing material that includes a magnetic material, the multi-functional nanoparticles further comprising hydrogen held by a reversible hydrogen absorbing material that is in thermal contact with the energy absorbing material, the energy being delivered via at least one of an alternating magnetic field and an electromagnetic wave, wherein upon the delivery, the energy absorbing material emits thermal energy and hydrogen is released from the hydrogen absorbing material.

15. The method of claim 14, wherein the hydrogen comprises multiple isotopes of hydrogen, wherein a first isotope of hydrogen is released from the hydrogen absorbing material at a first release condition and a second isotope of hydrogen is released from the hydrogen absorbing material at a second, different release condition, the method including varying the first and second conditions and thereby selectively releasing the first isotope and separating the first isotope from the second isotope.

16. The method of claim 14, further comprising following release of the hydrogen feeding additional hydrogen to the bed, the hydrogen absorbing material absorbing the additional hydrogen.

17. The method of claim 16, further comprising repeating the release and absorption cycle.

18. The method of claim 14, further comprising varying a characteristic of the energy delivery to control the rate or amount of the hydrogen release.

19. The method of claim 18, wherein the energy being delivered comprises energy delivered via an alternating magnetic field, and the characteristic comprises varying the field strength of the alternating magnetic field.

* * * * *